United States Patent [19]

Wright et al.

[11] Patent Number: 4,900,903

[45] Date of Patent: Feb. 13, 1990

[54] AUTOMATED TRANSACTION SYSTEM WITH INSERTABLE CARDS FOR TRANSFERRING ACCOUNT DATA

[75] Inventors: Christopher B. Wright, San Francisco; Stephen Bristow, Los Altos Hills, both of Calif.

[73] Assignee: Wright Technologies, L.P., San Francisco, Calif.

[21] Appl. No.: 258,579

[22] Filed: Oct. 17, 1988

Related U.S. Application Data

[62] Division of Ser. No. 935,244, Nov. 26, 1986, Pat. No. 4,802,218.

[51] Int. Cl.$^4$ .............................................. G06K 5/00
[52] U.S. Cl. ..................................... 235/380; 235/381
[58] Field of Search ..................... 235/379, 380, 381; 364/464.01, 464.03

[56] References Cited

U.S. PATENT DOCUMENTS

| | | | |
|---|---|---|---|
| 3,852,571 | 12/1974 | Hall et al. | 235/380 X |
| 4,277,837 | 7/1981 | Stuckert. | |
| 4,450,535 | 5/1984 | Pommery et al. | |
| 4,454,414 | 6/1984 | Benton. | |
| 4,490,798 | 11/1984 | Franks et al. | |
| 4,575,621 | 3/1986 | Dreifus. | |
| 4,709,136 | 11/1987 | Watanabe. | |
| 4,747,049 | 5/1988 | Richardson et al. | 235/380 X |
| 4,755,660 | 7/1988 | Nakano | 235/380 |

Primary Examiner—David L. Trafton
Attorney, Agent, or Firm—Leighton K. Chong

[57] ABSTRACT

An automated transaction system employs microprocessor-bearing user cards each issued to a respective user for maintaining a history of user account transactions and a user account balance, microprocessor-bearing master cards issued to vendors for maintaining a history of master account transactions and a master account balance, and terminals in which a user card and a master card are inserted for performing account transfer transactions wherein value from the account balance of one card is debited and the account balance of the other card is correspondingly credited. A transaction history recorder is used to produce or record the transaction history stored in the card for the user of the vendor. In the preferred embodiment, each master card is assigned to a respective terminal of a vendor and maintains a history of the transactions executed at that terminal between the master card and user cards presented for transactions at the terminal.

7 Claims, 11 Drawing Sheets

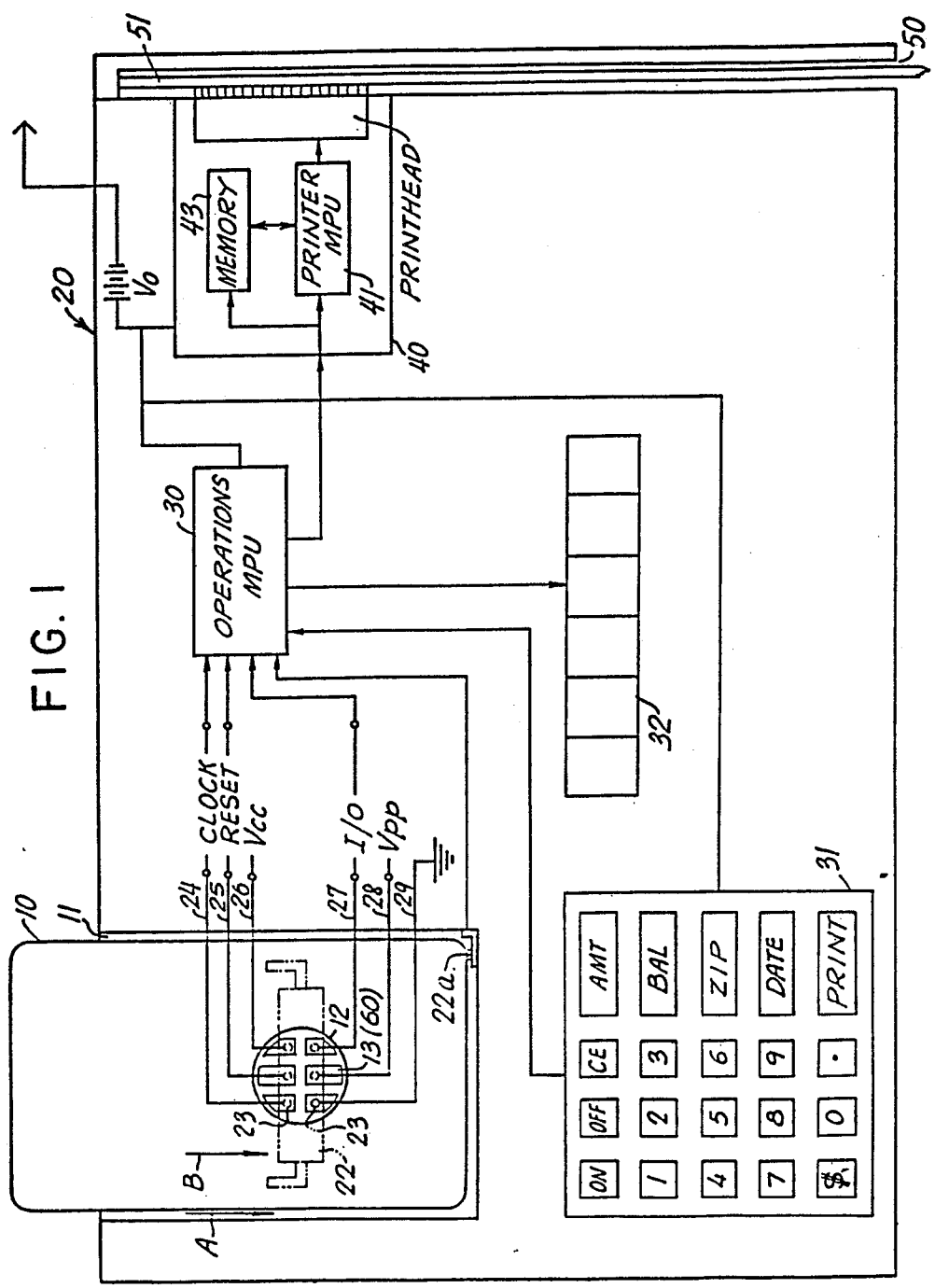

AUTOMATED TRANSACTION SYSTEM WITH INSERTABLE CARDS FOR TRANSFERRING ACCOUNT DATA

This is a divisional application from the prior application Ser. No. 935,244, filed on Nov. 26, 1986, entitled "Automated Transaction System Using Microprocessor Cards", issued as U.S. Pat. No. 4,802,218.

FIELD OF INVENTION

The invention relates to an automated transaction system which receives with a user card having a microprocessor for executing secure transactions in which an article or item of value is dispensed from a terminal, and an account balance stored in the card's memory is debited. In particular, the invention is applied to a postage transaction system in which a postage account is maintained within the microprocessor card and is used in transactions with postage printing and metering terminals.

BACKGROUND OF INVENTION

Point-of-sale (POS) terminals and automated teller machines (ATM) have been widely used in conjunction with various types of cards issued to users for sale or credit transactions. For example, banks regularly issue account cards which have a magnetically coded number stored on a stripe for accessing the user's account through ATM terminals. Credit cards which have coded magnetic stripes are inserted in ATM or POS terminals to access a central account system for authorization of a credit transaction. There also have been proposals to use cards which have large non-volatile memories, e.g. magnetic, integrated circuit (IC), or optical memory storage, for storing and retrieving information specific to the user, such as a medical history, biographical history, maintenance of an account balance and transaction history, etc.

These conventional systems generally employ a card which has a passive memory that is read in a card reader or computerized terminal maintained by a vendor. The security of the cards is problematic since most account cards used conventionally are passive and do not authenticate themselves or the particular transactions for which they are used. Instead, on-line access through a terminal to a central account system, such as bank or credit card account records, is required for confirmation of each transaction. This requirement places an access time and cost burden on vendors, such as bank branches and retail stores, which must maintain the terminal facilities, as well as on the operator of the central account system, which must provide sufficient on-line access for all the users of the system and ensure the security of the entire system.

By comparison, off-line transactions, i.e. between a user with an authorized card and a terminal not connected to a central account system, have the advantage that the vendor does not have to confirm each transaction. A card bearer merely inserts the card in a terminal to pay for a purchase and the authorized amount of the card is debited for the amount of the transaction. In off-line transactions, the vendor's responsibility can be reduced and the transaction process simplified, so that a transaction can be completely automated through the use of widely distributed user cards and automated terminals.

However, off-line transactions are more vulnerable to the use of counterfeit cards and to tampering with the terminals. Thus, the cards have to be made secure and the transactions limited to small amounts. As an example of conventional card security measures, a memory card can be divided into a number of separately validatable sectors of limited value which are irreversibly debited with each transaction, as disclosed in U.S. Pat. Nos. 4,204,113 and 4,256,955 to Giraud et al. A personal identification number (PIN) can be written into the card's memory at the time of issuance and requested of the user with each transaction. Terminals are generally made secure by maintaining them in areas to which access is restricted or supervised. However, these requirements increase the cost of operating the system and at the same time decrease its utility.

The sophistication of card counterfeiting and credit fraud has increased with the widespread use of account and credit cards, and even greater security measures are currently needed to ensure the validity of card transactions. Conventional microprocessor cards employ resident programs to control access to data stored on the card, store a selected user PIN to confirm an authorized user, and prevent use of the card if an unauthorized user is detected, such as after a limited number of incorrect PIN entries. Although such microprocessor cards provide greater security than passive cards, the overall system is still vulnerable in that, once a valid user's PIN has been ascertained, a stolen card can be used for unauthorized transactions in any terminal, and the terminals themselves are subject to penetration. These vulnerabilities can be offset by limiting the authorized amount of the card, controlling access to the terminals, or requiring on-line confirmation of transactions. However, such measures again increase the cost of the system and decrease its utility.

One potential area of application of automated systems employing account or credit cards is in postage vending and metering machines. Purchases of postage and mailing transactions are made primarily in person with cash through tellers at post offices. Only limited types of postage stamps can be purchased from public vending machines. Most private postage metering machines have limited operational features and must have their metering devices removed periodically to a post office for refilling. The size and weight of the metering devices make them inconvenient to carry. Some metering systems can be refilled by a remote computer, but the caller must still phone the computer center and execute the operator's instructions on the postage meter manually.

The elimination of cash purchases, in-person mailing transactions, unnecessary limitations on automated postal services, and physical refilling of postage metering machines could greatly reduce the waiting lines at post offices and facilitate the wider dissemination of postage vending and metering machines for the convenience of users and provide greater access to postal services. The use of account or credit cards for automated postal machines has been considered. However, the security problems of conventional card automated systems would require that user cards be validated only for relatively small amounts of prepaid postage, that vending and metering machines provide limited postal products and be refilled with limited total postage amounts, and that access to the machines be strictly controlled. These restrictions are a substantial obstacle which contribute to the difficulty of implementing an automated postal transaction system.

SUMMARY OF INVENTION

In view of the foregoing disadvantages and problems of conventional systems, it is a primary purpose of the invention to provide an automated transaction system which has security features that will facilitate the widespread use of account or credit cards for off-line transactions and the dissemination of automated transaction terminals to which access does not have to be strictly controlled. A principal object of the invention is to provide an interactive card/terminal system in which the card and the terminal each have a security feature which prevents the completion of a requested transaction unless a secure handshake recognition procedure is mutually executed between the card and the terminal such that they each recognize the other as authorized to execute a transaction. In particular, it is desired that the card and the terminal cooperate together to execute a simultaneous dispensing of value by the terminal and debiting of an authorized balance by the card.

A specific object of the invention is to apply the above-mentioned automated transaction system to postage metering machines. A further object is to provide a new generation of card automated postal terminals which have greater flexibility in the range of postal products and services offered, wherein the terminals are individually secure and can be accessed in relatively unrestricted areas, and the cards can be refilled at any desired location through secure refilling terminals validated by the issuer.

In accordance with the purposes and objects of the invention, a card automated transaction system employs a card having a secure, resident microprocessor which operates to confirm that a requested transaction is authorized and to then initiate an interactive handshake recognition procedure with a resident microprocessor in the value dispensing section of an automated terminal. Upon successful completion of the handshake procedure, the card microprocessor and the dispensing section microprocessor simultaneously actuate the dispensing of the requested article or item of value and the debiting of an authorized balance from the card.

A particular embodiment of the invention is a mutual handshake recognition procedure executed as follows: (1) upon confirming that a requested transaction is authorized, the card passes to the terminal a word comprising a randomly generated or other object number encrypted by a first resident algorithm and a key number stored in the card; (2) the terminal decodes the number using a corresponding inverse of the first algorithm and the key number; (3) the terminal sends back to the card a second word comprising the decoded random number encrypted by a second resident algorithm and the key number; (4) the card decodes the second word using a corresponding inverse of the second algorithm and the key number and compares the decoded number to the one originally sent; (5) if the numbers match, the card microprocessor debits its authorized balance for the indicated amount of the transaction and sends an actuation signal to the terminal to proceed with the transaction; and (6) upon receipt of the actuation signal, the dispensing microprocessor actuates the dispensing section to complete the transaction. The transmitted actuation signal may also be encrypted and decoded by the above algorithms or a similar method.

Under the principles of the invention, the above-described interactive card automated transaction system is applied to postage metering machines. In one embodiment, a postage metering terminal has a slot for receiving a microprocessor card issued with an authorized balance, a print head with a secure microprocessor which interacts with the card microprocessor, a keypad, a display, and an operations microprocessor which accepts a keyed input of the postage amount requested, displays the keyed input, queries the card to authorize and initiate the postage printing transaction, and then resets the machine for the next transaction or executes a series of transactions in a repeat mode.

In a related embodiment, a postage metering terminal has a first slot for receiving a user microprocessor card, a second slot for receiving a postal rate card, a print head with a secure microprocessor, a keypad and other means for entering source and destination (postal zip) codes, means for entering the weight and postal class of the article to be mailed, and an operations microprocessor having a program for calculating the correct postage based upon the listings of the rate card and the keyed-in information.

The card automated postal transaction system can be readily applied not only to the postal products and services of the U.S. Postal Service, but also to private carriers and parcel delivery companies. In a further embodiment, a postal waybill terminal has a third slot for receiving a special services card which has stored data from which the terminal can print postal and delivery services information on standard form blanks. For example, the special services card can be used to print Post Office forms, such as Certified Mail or Registered Mail, or the waybills of private carrier companies. The terminal is also provided with a full field display of the waybill form, prompts the user for information by programmed cursor movements, and has command keys for inputting sender and addressee information, rate or service class, waybill number, carrier information, etc.

As subsidiary features, the microprocessor cards can be configured to provide different types of access to the terminals as desired, for example, limited numbers or types of users in limited numbers or types of machines, unlimited users in limited machines, limited users in unlimited machines, or unlimited users in unlimited machines. The different types of access can be implemented by storing key numbers in the card for identifying authorized users and/or machines, and/or key numbers in the terminal operations microprocessor for identifying authorized users. The user cards can also be configured at the time of issuance for limits to the amounts and types of individual transactions, and temporary or permanent locking upon detection of an unauthorized user or card. Another system feature is the storing of a history of transactions executed by the card, and the recomputing of the remaining balance upon each transaction request, in order to save card memory space. A separate transaction printer may be used to obtain a printout of the card's transaction history.

The postage metering terminals according to the invention are also provided with means for allowing a post office or carrier to authenticate the postage marks or waybills that are printed. In one embodiment, the terminal printer prints within or under the postmark a coded number or sequence of marks corresponding to an element of the postmark, such as the amount of postage, the terminal identification number, and/or the sender's zip code. The marks may be disguised or made invisible by printing with a magnetically or optically readable ink to deter tampering or unauthorized simulation. They may then be machine-read by the post office or private carrier company to determine whether the printed postmark was printed by an authorized printer, and at the same time provide an audit trail to the sender.

In accordance with a further application of the invention, an integrated system of microprocessor cards and terminals provides transaction facilities which permit widespread use and convenient access to users. The authorized amount of the user card may be initially validated or refilled from a master refilling card, which has a larger authorized amount, preferably in conjunction with a supervisor card issued under strict distribution control. A refilling terminal is provided with three insertion slots for the three cards, and has an operations program to check the identity of the master refilling card and the user card to determine if they are valid for use in the refilling terminal. Upon clearance, the secure handshake recognition procedure must be successfully executed between the microprocessors of the supervisor and master cards in order to permit a debit to the master card of the refill amount and a credit to the user card. If the user card is a new card, a validation procedure and the selection and storing of a user PIN are executed.

The card automated transaction system of the invention has broad applicability to many other types of purchase or credit transactions besides postal services and products. For example, it can also be used for credit card transactions, inventory control, bills of lading, automated cash machines, or virtually any other type of transaction in which a user account must be securely debited through an automated terminal in exchange for an article or item of value. The invention is especially advantageous in off-line transactions in which distributed terminals not under strict access controls are used. The above principles, advantages, and features of the invention are described in further detail below in conjunction with the following drawings.

BRIEF DESCRIPTION OF DRAWINGS

FIG. 1 illustrates schematically a preferred embodiment of an automated postal transaction terminal using a microprocessor card in accordance with the invention;

DETAILED DESCRIPTION OF INVENTION

Figure 2A:
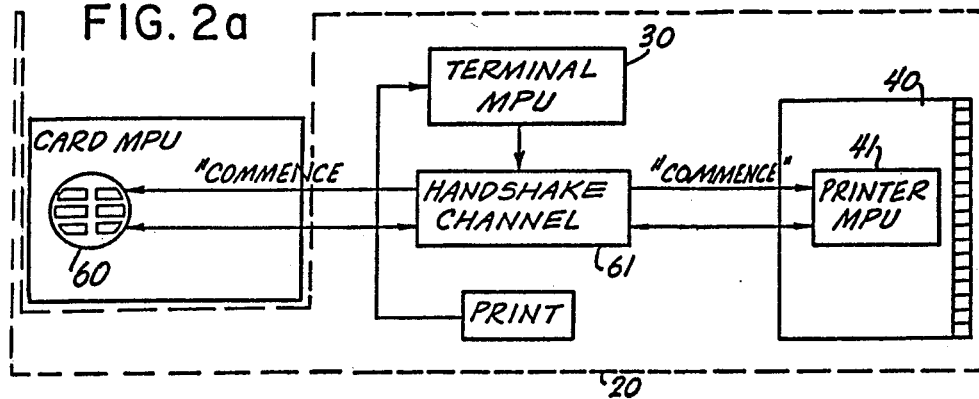
FIG. 2a shows a structure in the embodiment of FIG. 1 for executing a secure handshake recognition procedure between the microprocessor card and a value dispensing section of the terminal, and FIG. 2b outlines the handshake sequence.

In accordance with the basic principles of the invention, an automated transaction system employs a microprocessor card in an automated transaction terminal. Various types of microprocessor cards are available commercially, and the technology of manufacturing such cards and using them in terminal devices is well understood. As an example, Micro Card Technologies Inc. of Dallas, Tex. makes the Micro Card Mask M4 card which is a standard (ISO) size, similar to a credit card, having an 8-bit microprocessor, 8 contact pinout, 9600 bps asynchronous serial exchange protocol, 12.8 Kbits of Read-Only Memory (ROM), 288 bits of Random Access Memory (RAM), and 8 Kbits of Erasable/-Programmable ROM (EPROM). An array of electrical contacts provided in one section of the card connects with the corresponding contacts in the terminal to allow the card microprocessor to communicate data with the terminal. It is of course understood that other types of data communicating connections can be used, such as, for example, by magnetic induction.

The conventional microprocessor card as used in the present invention operates by executing an internally stored program (firmware) which cannot be accessed from the outside. The firmware may be written in randomized form to secure it against tampering from the outside. An electrically programmable (EPROM) memory portion associated with the microprocessor of the card is generally divided into three zones: a secret zone which can only be accessed internally; a protected read/write zone which can only be accessed after a key number or PIN has been confirmed, and a free-reading zone. The card is used in a terminal for performing desired functions in accordance with the rules, procedures, and data stored in or executed by the card and the terminal.

When conventional microprocessor cards are issued to individual users, a validation procedure is executed on a validating terminal. The procedure generally requires the issuer to enter the correct manufacturers' serial number of the card in order to confirm that the card is authorized. A PIN is then assigned to or selected by the cardholder and stored in the secret zone. Moreover, a secret key number unique to the issuer, which may be common to a class or chronological series of cardholders, may also be stored in the secret zone. In some card systems, the secret key is used as an argument of an encryption algorithm to send an encrypted word to the terminal for verification. If the word can be decoded by the terminal to derive the secret key, the card is presumed to be authentic. Upon completion of the validation procedure, the card MPU irreversibly alters its program so that no further words can be written in the secret memory zone. Thereafter, upon using the card, a user must enter the correct PIN in order to confirm that the card is being used by its authorized user. Conventional microprocessor cards also have the feature of temporarily or permanently locking the card from use if a succession of incorrect PIN entries on a terminal is detected.

At the time of issuance, an amount in monetary or other units is validated for the card being issued. In conventional cards, the amount is permanently written in one of a plurality of transaction sectors in the protected memory zone. Each time the card is to be "filled" with a new amount, one of the sectors is unlocked and written with a new amount by the issuer. Thus, a limited authorized amount can be written each time, and the card is then refilled a number of times before its memory space is used up. This is a security feature to minimize monetary loss in case the card is lost or stolen. The authorized amount is decremented with each transaction and a new balance is written until the balance is used up. Although any amount or balance can be written into the card's transaction memory, as a further security feature the card may prevent a balance being written which exceeds a predetermined limit or a previously written balance.

A card automated transaction system incorporating the particular features of the invention will now be described. It should be understood that although particular embodiments are described, the invention is not limited to such embodiments, but encompasses all modifications and variations which use the principles of the invention. For purposes of this description, the transaction terminal is selected to be a postage metering terminal for printing a postmark on a label, envelope, or waybill for articles to be mailed or shipped. However, it should be understood that the general principles of the invention have broad applicability to any type of transaction terminal in which a microprocessor card may be used. For example, the terminal may also be a cash or article dispensing machine or a printer which prints validation marks, coupons, receipts, tickets, inventory documents, etc.

POSTAGE METERING TERMINAL

Referring to FIG. 1, a microprocessor card 10, as previously described, is adapted to be inserted in a card insertion slot 11 of an automated transaction terminal 20. The card 10 has a contact section 12 supporting a number of contacts 13 connected to the pinout leads of an IC chip including a microprocessor unit (card MPU) 60 laminated beneath a protective layer of the card contact section 12. The contacts 13 are mated with corresponding contacts 23 of a terminal contact section 22 upon insertion of the card 10 into the slot 11 in the direction indicated by arrow A. As the card is inserted, its leading edge abuts a part of the terminal contact section 22 which is moved in the same direction, indicated by arrow B, so as to merge in operative electrical contact with the card contact section 12. A trip switch 22a is provided at the base of slot 11, and triggers a start signal to an operations microprocessor (terminal MPU) 30 when the card has been fully inserted in position in the slot.

The card MPU 60 executes an internally stored (firmware) program to check whether a requested transaction is authorized and, prior to debiting the card account balance, to perform a secure handshake recognition procedure (described further below) with a microprocessor in the terminal. Although the handshake procedure can be performed with an operations microprocessor for the terminal, or one remote to the terminal, it is preferred in the invention that the procedure be performed with a secure microprocessor embedded in the actual value dispensing section of the terminal. The value dispensing section is a separate element in the terminal, and its microprocessor is made physically secure, such as by embedding it in epoxy, so that any attempt to tamper with it would result in rendering the value dispensing section inoperative. For the postal transaction terminal of the invention, the microprocessor is embedded in the printer unit which prints the postmark.

The terminal contacts 23 are connected with the functional parts of the terminal, including a Clock synchronizing connection 24, a Reset connection 25, an operational voltage Vcc connection 26, an Input/Output (I/O) port 27, an EPROM-writing voltage Vpp connection 28, and a ground connection 29. The terminal MPU 30 controls the interface with the card and the operation of the various parts of the terminal, including a keyboard 31, a display 32, such as an LCD, and a postmark printer 40, which is the value dispensing section of the terminal. A power source Vo is provided by a battery and/or an external AC or DC line to power the various parts of the terminal.

The printer 40 has a microprocessor unit (printer MPU) 41 which individually and uniquely controls the operation of a print head 42, such as an electrothermic or impact print head. The MPU 41 executes an internal program (firmware), like the card microprocessor, so that it cannot be tampered with from the outside. The printer MPU's internal program includes unique encryption algorithms parallel to those stored in the card's microprocessor, installed by the manufacturer, so that the printer MPU can execute a secure handshake recognition procedure with the card's microprocessor to authorize a requested transaction. The MPU 41 is also formed integrally with the print head 42, such as by embedding in epoxy or the like, so that it cannot be physically accessed without destroying the print head. Thus, according to the invention, the print head 42 of the postage metering terminal 20 can only be operated through the MPU 41, and will print a postmark only when the handshake recognition procedure and a postmark print command have been executed between the card MPU and the printer MPU 41.

When a terminal is to be installed by the issuer in a location or distributed to a retail intermediary for field use, the issuer may also execute a validation procedure for the terminal similar to that for the card. A secret key number may be written in the secret memory zone of the printer MPU 41, so that postage printing transactions can only be executed with cards provided with the corresponding secret key number. Thus, cards validated by another issuer, even though obtained from the same manufacturer, will not be usable in the first-mentioned issuer's machines.

The terminal MPU may of course be used for the handshake recognition procedure. However, it is preferable to have the procedure executed by the part which is actually dispensing the article of value, and to leave the terminal MPU operable for general terminal operations. A machine ID number (MIN) may also be assigned to the terminal so that it can be recorded in the transaction history maintained on the card. As a further feature, the MIN for one or more of the issuer's terminals can be stored in cards which are to be used only in those terminals. Thus, in an automated terminal system provided for one company, the terminals within the company can only be used with the cards issued to the employees of that company which have the company's secret key number and, optionally, the terminals within a department of the company may be configured to accept only cards provided with the MINs of that department's machines.

The interactive operation of the card/terminal system will now be described. Upon inserting a card in slot 11, the trip switch 22a is triggered, and the terminal MPU 30 initiates an identification request procedure to confirm that the card is being used by an authorized user. For example, the terminal MPU may cause a prompt to appear on the display 32 requesting that the user enter a PIN. The number entered by the user is sent by the terminal MPU to the card MPU where it is checked against the PIN number(s) stored in the secret zone of the card's memory. If the number matches, the card MPU notifies the terminal MPU 30 to proceed. If the card is restricted for use only in particular machines, the card may request the terminal's MIN and check it against a stored list of authorized terminal numbers. If the terminal is restricted for use only with certain cards, the terminal may check the PIN or a card identification or account number against a stored list of authorized card numbers. As another security feature, the card program may check the number of incorrect PIN entries attempted or a card expiration date written in memory at the time of issuance. If the incorrect PIN entries exceeds a predetermined number, or if the current date indicated from the terminal MPU 30 is past the expiration date, the card MPU 60 can lock the card against further use until the user has had it revalidated by the issuer.

If the initial confirmation procedures are passed, the terminal MPU 30 next prompts the user to enter information for a postage transaction. The user inputs on keypad 31 the amount of postage requested and, as a further option, the zip code of the sender's location and the date. As the information is supplied in sequence, i.e. "Amount", "Zip", and "Date", it is displayed on display 32 for confirmation. Alternatively, the date may be maintained by the terminal MPU 30, and displayed for user confirmation. When all the correct information has been entered, an edge of an envelope 51 to be mailed, or a label or mailing form to be attached to an item to be mailed, is inserted in a slot 50 on one side of the postage metering terminal 20. The movement of the label or envelope may be controlled to bring it in registration with the print head, as provided in conventional metering machines. The user then presses the "Print" key to initiate a postage printing transaction.

HANDSHAKE RECOGNITION PROCEDURE

A basic principle of the invention is that the actual execution of a value-exchanging transaction is securely controlled by a mutual handshake recognition procedure between a secure microprocessor maintaining the card account balance and a secure microprocessor controlling the value dispensing operation. The card's MPU must recognize the value dispensing section's microprocessor as valid, and vice versa, in order to execute a transaction. The card and the value dispensing section therefore can each remain autonomous and protected against counterfeiting or fraudulent use even if the security of the other has been breached. Since they are autonomous, the cards and terminals can be distributed widely with a low risk of breach of the system and without the need for strict access controls. It thus has significant cost and security advantages over conventional card automated transaction systems.

A two-way encrypted handshake embodiment will now be described. However, it should be understood that the invention is intended to encompass any mutual handshake procedure by which the card and dispensing microprocessors can recognize the other as authorized to execute a requested transaction. In the preferred postage terminal embodiment, the handshake procedure is executed between the card MPU 60 and the printer MPU 41. As illustrated schematically in FIG. 2a, when the "Print" key signal is received by the terminal MPU 30, the latter opens a channel 61 of communication between the card MPU 60 and the printer MPU 41. A "commence" signal and the amount of the requested transaction, i.e. postage, is then sent from the terminal MPU 30 to the card MPU 60, and a similar "commence" signal to the printer MPU 41, in order to prepare the way for the handshake procedure.

Figure 2B:
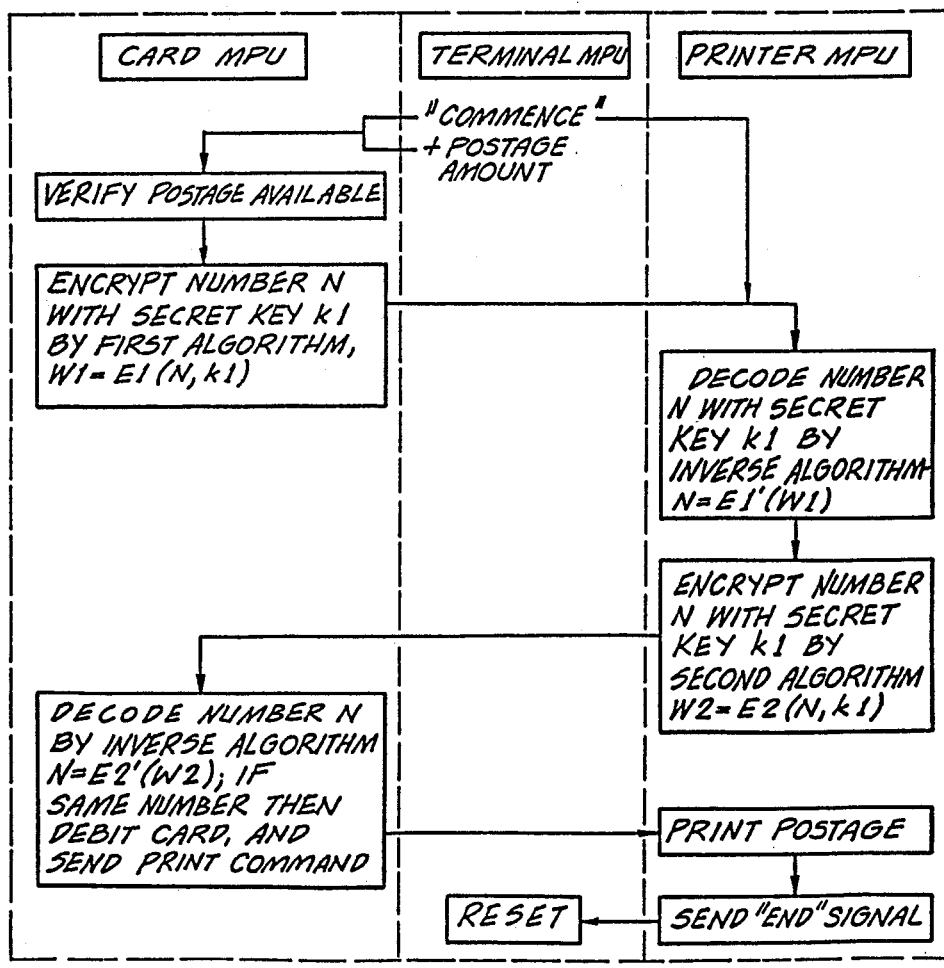

Referring to FIG. 2b, the card MPU 60 initiates the handshake procedure upon receipt of the "commence" signal by first verifying if the requested amount is available for the transaction. As an advantageous feature of the invention, the card MPU 60 checks the available balance of the card and (if implemented in the card's program) whether the requested transaction is within any limits specified by the card issuer. For example, use of the card can be limited to a maximum postage amount and/or class of postage for each transaction or a cumulative total of transactions. Upon verifying that the requested transaction is authorized, the card MPU 60 encrypts an object number N, which may be a randomly generated number, with a key number k1 (which may be the user's PIN) stored in the secret zone of its memory by a first encryption algorithm E1 and sends the resultant word W1 through the handshake channel 61 of terminal MPU 30 to the printer MPU 41.

Upon receipt of the word W1, the printer MPU 41 decodes the number using the same number k1 by the inverse algorithm E1'. The number k1 may be a secret key number stored in the printer MPU's memory at the time of validation, or in an open system, it may be the PIN entered by the user on the terminal, or a combination of both. The printer MPU 41 then encrypts the decoded number with the number k1 by a second encryption algorithm E2 to send a second word W2 back to the card MPU 60.

Upon receipt of the word W2, the card MPU 60 decodes the number again using the key number k1 by the inverse of the second algorithm E2', and compares the decoded number with the number it used in the first transmission. If the numbers match, the handshake procedure has been successfully completed, and the card and printer MPUs have recognized each other as authorized to execute the requested transaction. The card MPU then debits the postage amount from the card balance, and then sends a print command and the postage amount to the printer MPU. The printer MPU prints the postage on envelope 51, in cooperation with the terminal MPU 30 which controls the movement of the envelope under the print head. The printer MPU then sends an "end" signal to the terminal MPU 30, which accordingly switches off the handshake channel 61 and resets itself to receive the next transaction request.

In the preferred embodiment, the card MPU 60 stores only the amount of the transaction in its transaction record, and does not store the new balance. Instead, the balance is recomputed from the original authorized amount and the stored history of transaction debits at the time a transaction is requested. This procedure substitutes the MPU's computing power to save a significant amount of card EPROM memory space.

Figure 3:
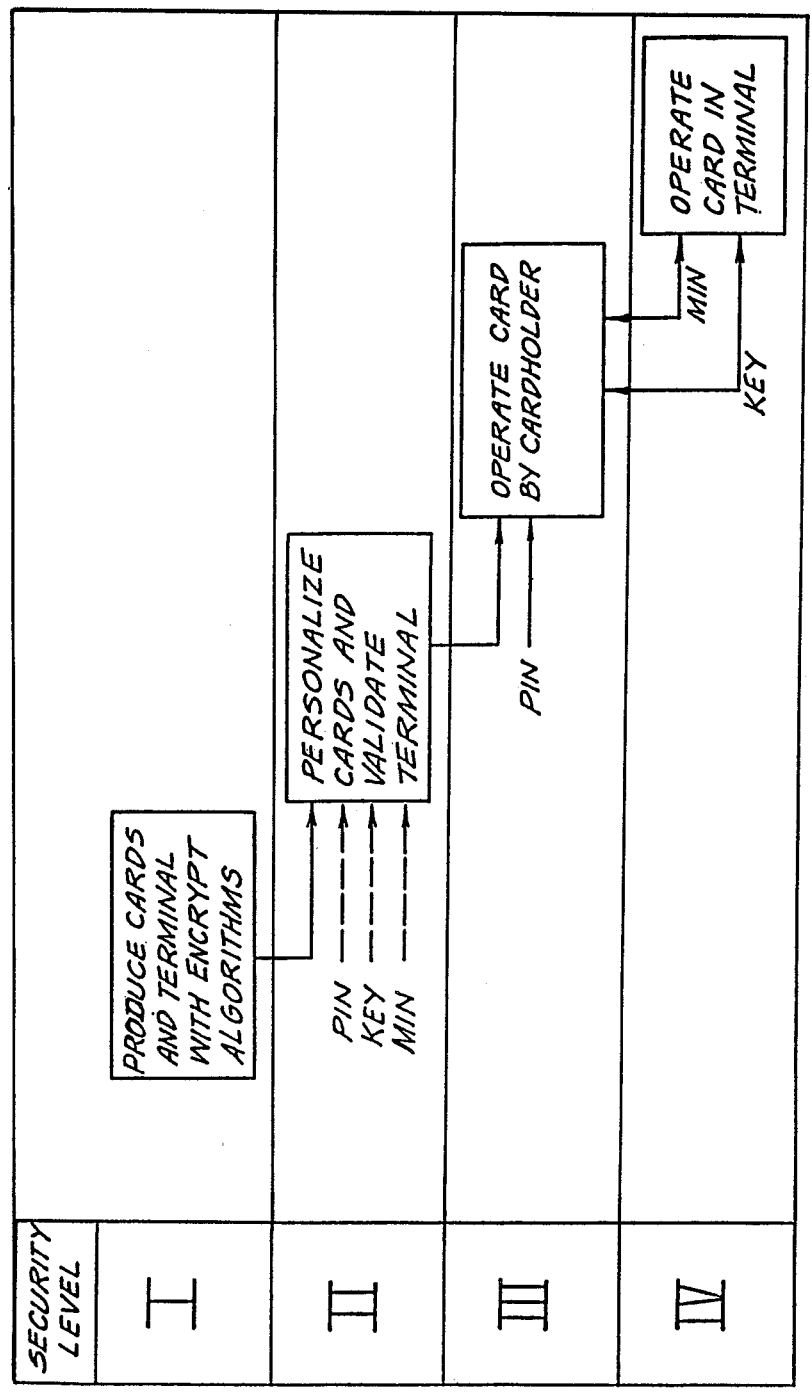
FIG. 3 illustrates the multiple levels of security provided by the system of FIG. 1.

The card automated transaction system of the invention is provided with high security at a plurality of levels, which is particularly advantageous for off-line transactions involving large numbers of issued cards and widely distributed terminal devices. As depicted in FIG. 3, the encryption algorithms are provided at the first security level I by the manufacturer, the secret key, PIN, and/or MIN are provided at security level II by the issuer, the PIN is used at security level III by a particular user, and the MIN and/or secret key may be used at security level IV to operate a particular machine(s).

At level I, the print head of the terminal is only operable to dispense value, i.e. print postage, if the encryption algorithms provided by the manufacturer match those of the card, thereby protecting against counterfeit cards and terminals. Even if the security of the manufacturer has been penetrated, and the encryption algorithms have been obtained by a counterfeiter, the secret key may be assigned at level II by the issuer and used in the handshake procedure, thereby deterring the use of counterfeit cards and terminals which do not have the secret key. At security level III, a card can only be used to operate a terminal if the corect PIN is known, and if initial confirmation procedures are passed. At security level IV, a card can only be used in a particular terminal identified by the correct MIN.

Figure 4:
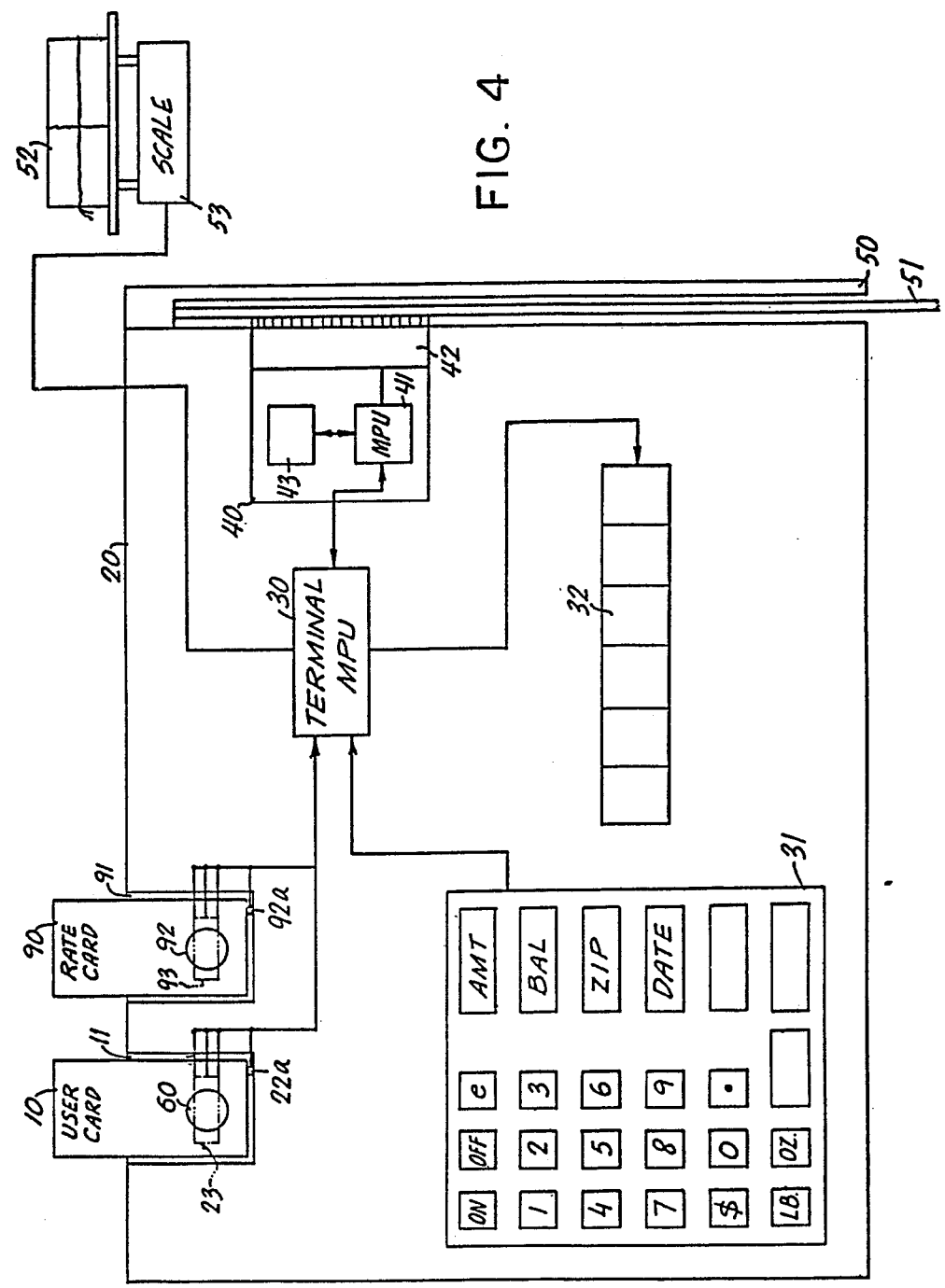
FIG. 4 shows another embodiment of the postal transaction terminal and an optional scale of the invention which receives a rate card for automatically computing postal amounts.

A related embodiment of the invention is illustrated in FIG. 4 which employs a second card having postal rate data stored in memory to compute the correct postage automatically. A terminal 20, similar to the one previously described, includes a second slot 91 for a "rate" card 90. The terminal has a slot 50 in which a postal label or envelope 51 is inserted for imprinting by the printer 40. For a parcel 52, the label 51 is printed then affixed to the parcel for mailing. A scale 53 may be connected to the terminal and MPU 30 to provide the weight of the envelope or parcel 52.

The rate card has a memory device 92, preferably an IC ROM, which is accessed and read by the terminal MPU 30 through contact portion 93 mated in contact with the pinout terminals of the memory device. Switches 22a and 92a provide signals when the user and rate cards have been inserted in the respective slots. Insertion of the user card initiates operation of the terminal. If a rate card is not inserted, the terminal MPU 30 can instead request the appropriate postal amount from the user by a prompt on the display 32. The terminal MPU may also have a mode for reading postal rates from the rate card.

Figure 5:
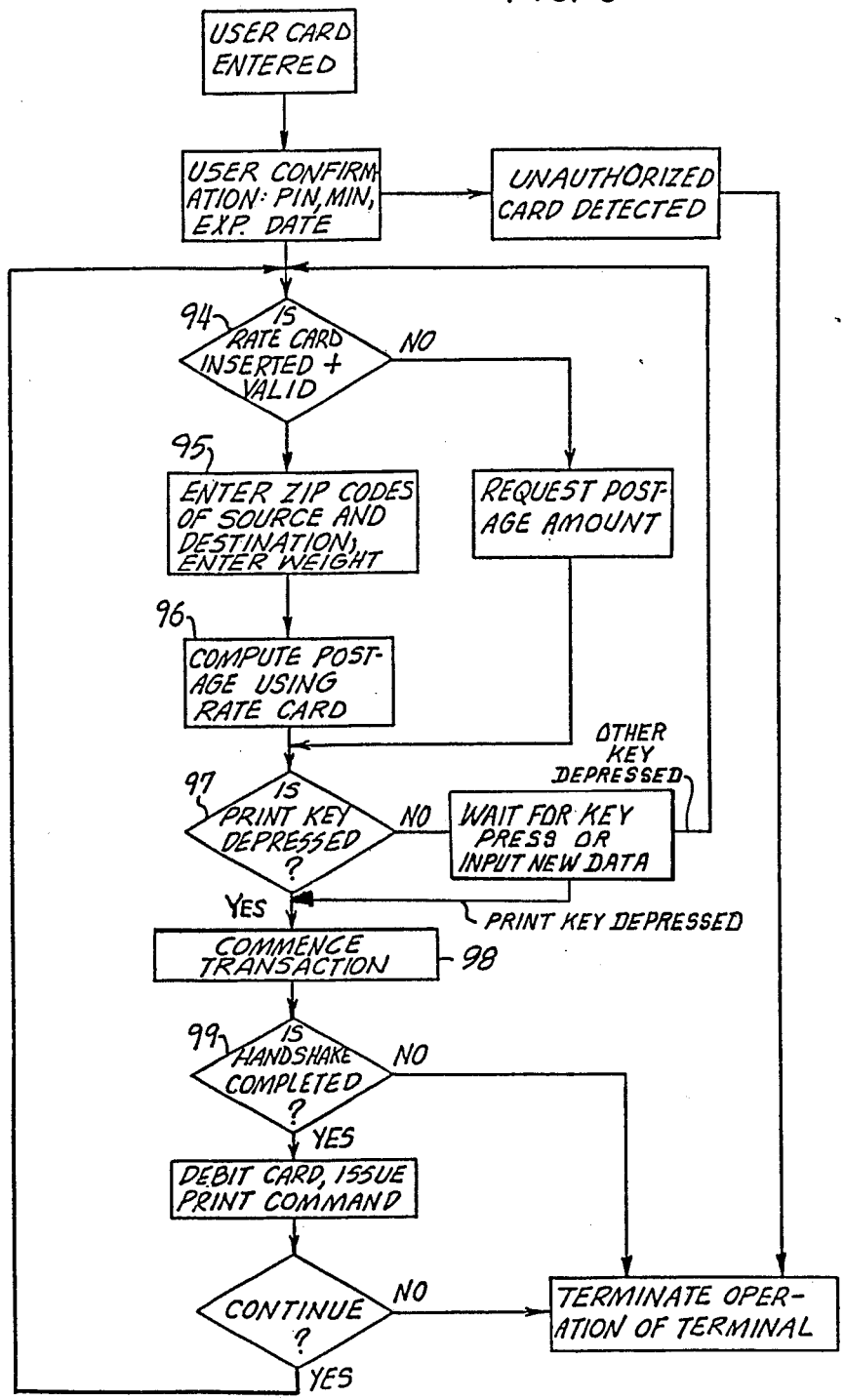
FIG. 5 is a flow diagram of the operation of the terminal of FIG. 4.

The program operation of the postage metering terminal 20 is illustrated in block diagram form in FIG. 5. Upon insertion of the user card 10 in slot 11, the user confirmation procedures previously described are carried out between the terminal MPU 30 and card MPU 60. If an unauthorized card or user is detected, the card is locked and the terminal operations are terminated. If a valid user card is confirmed, the terminal program then checks if a rate card 90 is inserted and whether it is valid. Validity can be determined by the issue number of the card or by an indicated expiration date. If there is no rate card, the terminal MPU requests the user to input the desired postage and goes to the print key decision block 97. If a valid rate card is present, the terminal program requests the codes for the source and destination of the item and the class of mail desired. The program then checks for a signal from the scale 53 indicating the weight of the item. If no scale is connected or weight indicated, the program requests the user to input the information.

The rate card memory contains a current listing of the rates for a particular carrier divided according to zone classifications, weight, and/or type of mail. For the U.S. Postal Service, the postage amount is calculated based upon the origin and destination zip codes, class of mail, and weight by looking up tables stored in the rate card memory 92. If the "Print Key" is depressed, the terminal program then sends the "commence" signal to the card MPU and printer MPU to execute the handshake procedure and debiting and printing operations as previously described. If an "Auto" mode key of the terminal has been pressed or the user elects to continue in response to a prompt, the terminal program returns to the beginning of the transaction loop indicated at block 94. The "Auto" mode may be used in conjunction with an automatic feeder for postmarking a series of envelopes or labels. The terminal operation is terminated if the transaction loop is not continued, or if the handshake procedure is not completed.

Postmark Authentication

In accordance with the principles of the invention as applied to postage metering terminals, a postmark authenticating procedure will now be described. The procedure is provided as a security feature to deter the printing of a counterfeit postmark by a printer, copier, or other facsimile device which is not authorized by the issuer of the above-described card/terminal system. Conventional high resolution printers and graphics capabilities of personal computers present an increasing risk that value-confirming marks, such as a postmark, ticket, coupon, etc. can be simulated by a counterfeiter. In the invention, an underlying and/or invisible machine readable code is printed first and may then be overprinted with the human readable postmark. The code can be uniquely selected by the issuer of the postage card/terminal system, and periodically changed to eliminate any benefit from gaining unauthorized access to the code. Further, the code can be printed with ink that is invisible in the normal light spectrum, so that it is readable only with a magnetic, infrared, or ultraviolet reader.

Figure 6:
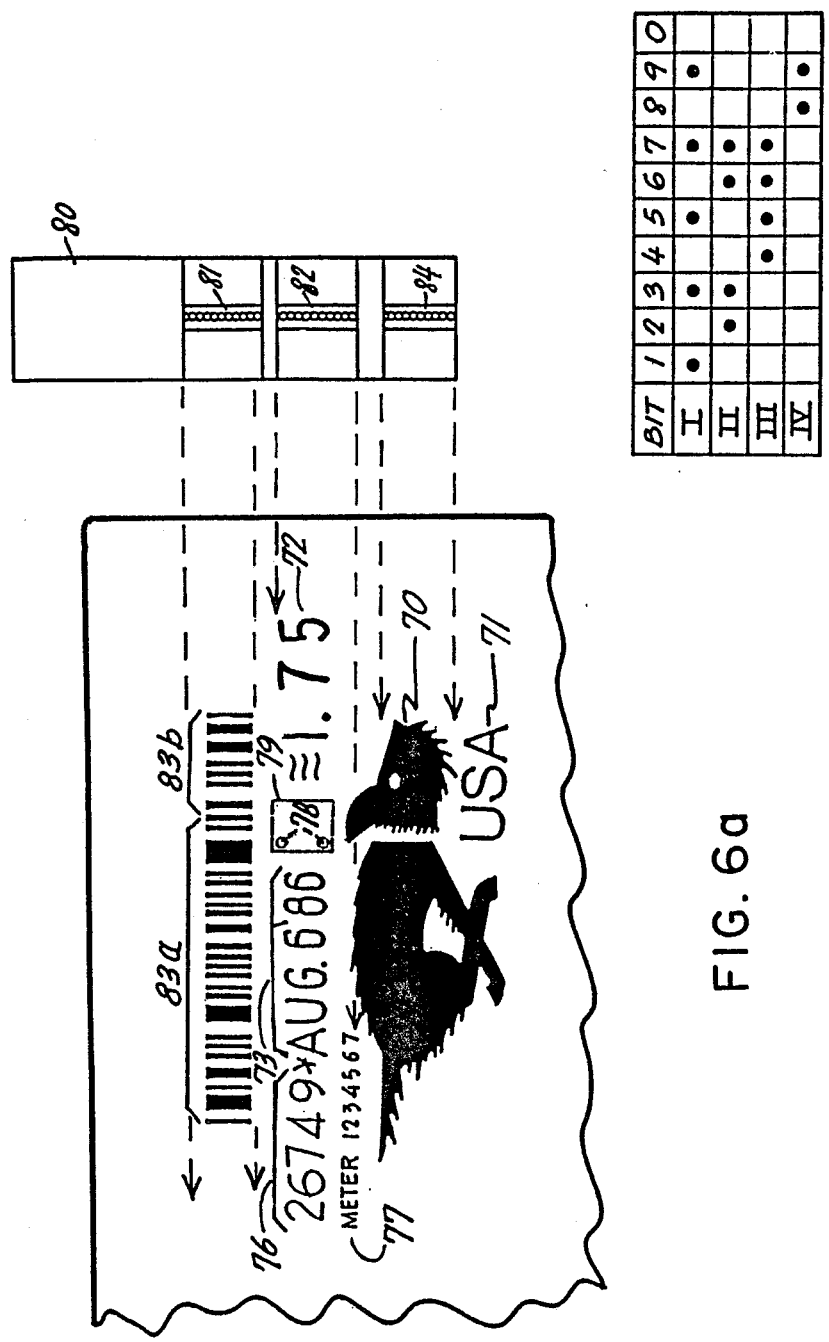
FIG. 6a shows the use of coded marks for authentication of a postmark printed by a postal transaction terminal.
FIG. 6b shows one exemplary form of authentication coding.

Referring to an example shown in FIGS. 6a and 6b, a conventional imprinted postmark has a logo or graphic design 70, text 71 indicating that the postage is issued through the U.S. Postal Service, numbers 72 indicating the postage amount, as well as the date 73, and zip code 76 indirectly identifying the city and state of origin, and the identification number 77 of the postage meter from which the postmark was printed. In the invention, coded marks 78 are printed within the visible postmark in a predetermined code field 79 in either visible or invisible, human or machine readable ink. The algorithm for the coded marks is selected by the issuer, for example, representing the binary equivalent of the postage amount, i.e. "90" cents in FIG. 6a, shown in binary form in FIG. 6b. The coded marks can represent any other element of the postmark, such as the meter identification number or zip code. Alternatively, a bar code 83 can be printed with a postmark information section 83a and a check code section 83b, which is encrypted based upon one of the postmark elements. The postmark element and/or the encryption algorithm can be uniquely selected by the issuer. Even if the coded marks are printed in visible form, the encryption of a variable postmark element, such as the sender's zip code, date, or postage amount, will make copying difficult.

The printing of the postmark and authentication code can readily be incorporated in the card terminal system illustrated in FIG. 1. The printer 42 is provided with a memory 43 to which data representing the visible information of the postmark and the computed binary or other selected check code or converted bar code is transmitted from the terminal MPU 30 and stored. The fixed graphics of the postmark may be stored in a memory associated with the MPU 30, which is preferable if the same terminal has the capability of printing a variety of postmark graphics for different carriers and/or classes of service, or it may be permanently stored in a section of the printer memory 43. The fixed graphics may instead be stored in the card's memory and loaded by terminal MPU 30 in the printer memory 43 for a requested transaction. Alternatively, the fixed graphics may be provided on a platen which operates with the print head if only one type of postmark is to be printed.

In the preferred form, the print head 42 is an impact printer which has two ink ribbons 42a and 42b, one of invisible, machine readable ink and the other of visible ink. When the handshake procedure has been completed, and the print command issued by the card MPU 60, the printer MPU 41 accesses the data stored in the memory 43 and, in a first pass, prints the coded marks in invisible ink then, in a second pass, prints the visible postmark information.

As indicated in FIG. 6a, when mail or other articles are subsequently presented to a central mail routing and distribution system, such as that of the U.S. Postal Service or a private carrier, the postmark may be passed under a detector 80 which has a visible light spectrum reader 81 and a code reader 82, such as a magnetic, infrared, or ultraviolet reader, or a bar code reader 84 for bar code marks. If the code marks are absent or if the check code does not correspond to the element of the postmark selected for coding, an audit record can be made of the non-conformity, for example, by recording the meter identification number, date, and zip code of origin. An investigation of the source of the unauthorized postage can then be initiated if numerous articles are found bearing unauthorized postmarks. The postmark authentication marks of the invention thus provide an additional level of security against counterfeiting which is not offered in conventional postal metering machines.

Postal Waybill Terminal

Figure 7:
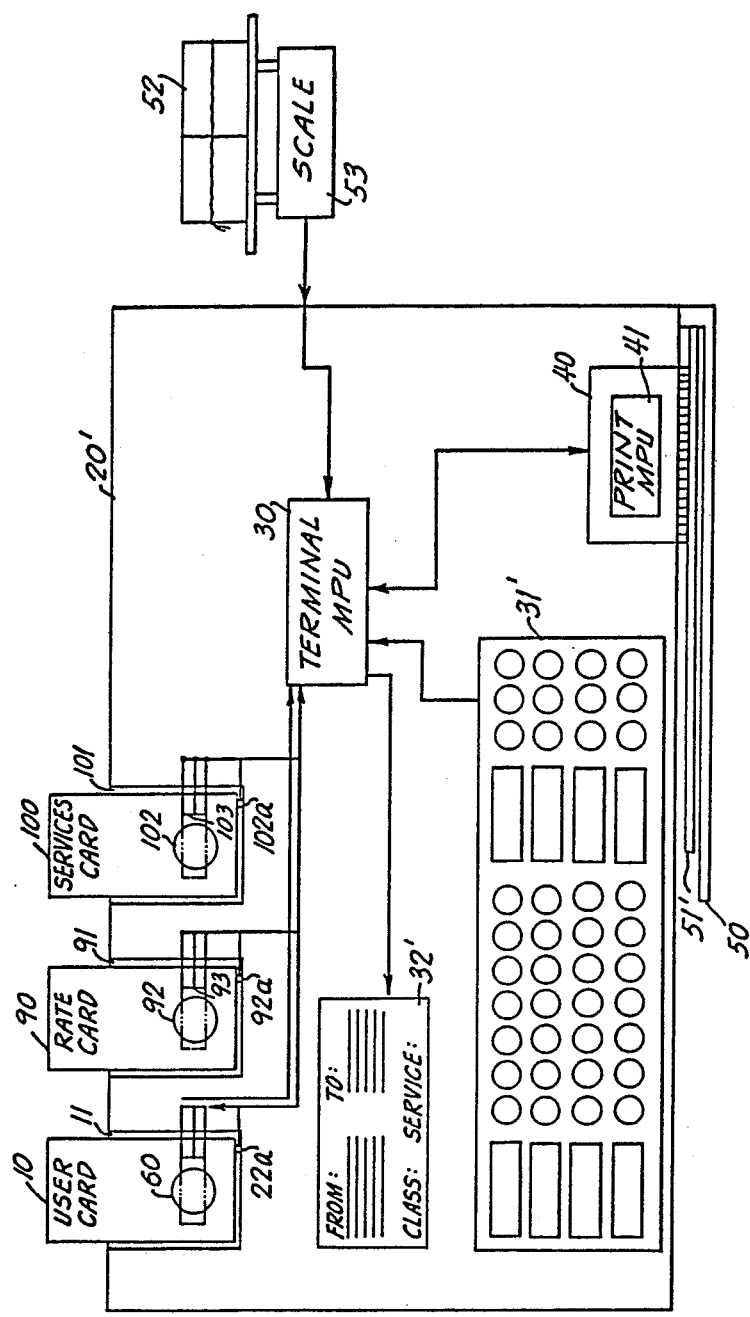
FIG. 7 illustrates schematically a preferred embodiment of an automated waybill printing terminal and an optional scale using a microprocessor card and a special services card in accordance with the invention.

A further embodiment of the invention is illustrated in FIG. 7 which is adapted for printing standard form waybills for mailing articles using a wide range of postal or private carrier services. A terminal 20' includes a slot 11 for a user card 10, a terminal MPU 30, a printer 40 and printer MPU 41, a keyboard 31', and a display 32', as previously described with respect to FIG. 1. The terminal also includes a second slot 91 for a "rate" card 90 and a third slot 101 for a "special services" card 100. The terminal has a slot 50 in which a standard waybill form 51' is inserted for imprinting by the printer 40. The waybill 51' is then affixed to an envelope or parcel 52 for mailing. A scale 53 can be connected to the terminal and MPU 30 to automatically provide the weight of the parcel 52.

The rate and special services card have memory devices 92 and 102, respectively, which are preferably IC ROMs that are accessed and read by the terminal MPU 30 through contact portions 93 and 103, respectively, mated in contact with the pinout terminals of the memory devices. Switches 22a, 92a, and 102a provide detection signals when the cards have been inserted in the respective slots. A display 32' provides a full field corresponding to the appearance of the waybill form, and the keyboard 31' includes a full set of alphanumeric characters and command keys.

The rate card memory contains a current listing of the rates for a particular carrier. For example, if the carrier is the U.S. Postal Services, the Post Office rates are listed according to zone classifications, weight, and class of mail. The special services card memory contains a program for filling out a standard waybill form in accordance with the information required by and with indicia identifying the mailing services of a particular carrier. For example, if the carrier is the U.S. Postal Service, the special services card can provide the programs for printing waybills for Express Mail, Certified Mail, Registered Mail, Insured Mail, etc.

Figure 8:
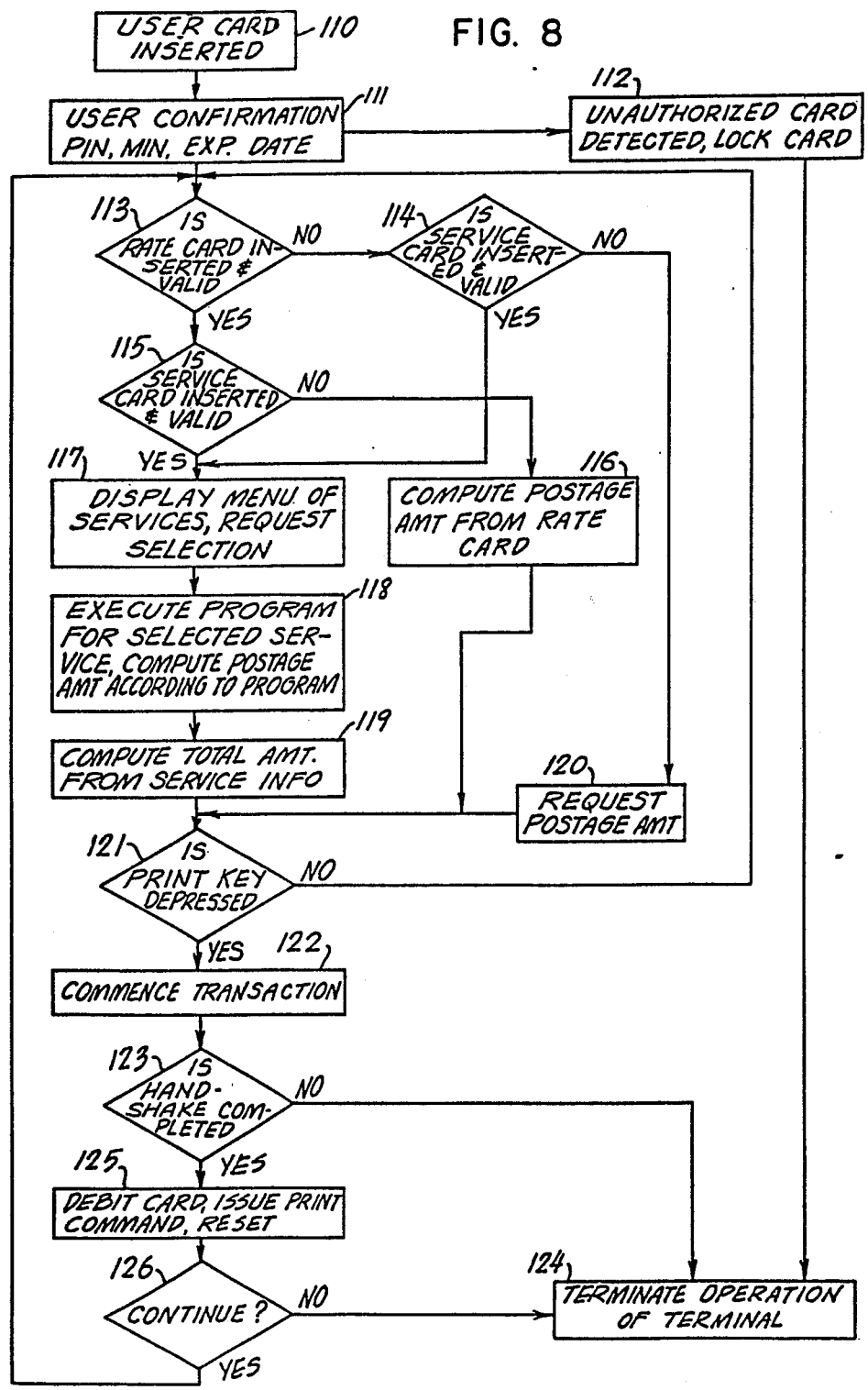
FIG. 8 is a flow diagram of the operation of the terminal of FIG. 7.
Figure 9:
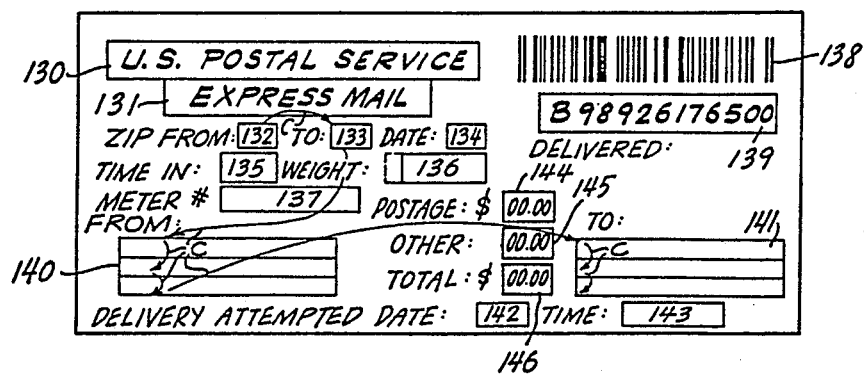
FIG. 9 illustrates a standard form of waybill and cursor prompts for filling in its information fields.

The program operation of the postal waybill terminal 20' is illustrated in block diagram form in FIG. 8, and a sample waybill form is shown in FIG. 9. Upon insertion of the user card 10 in slot 11, the user confirmation procedures previously described are carried out between the terminal MPU 30 and card MPU 60. If an unauthorized card or user is detected, the card is locked and the terminal operations are terminated. With a valid user card, the terminal program then checks if a rate card 90 and/or a special services card 100 is inserted and whether each is valid. Validity can be determined by the issue number of the card or by an indicated expiration date. If there is no rate card or special services card, the terminal MPU requests the user to input the desired postage and goes to the print key decision block 121. The terminal is then used to print a postmark or postage label as described previously. If a valid services card is present, the terminal program displays a menu of mailing or carrier services from the services card and requests the user to select a service.

The terminal MPU 30 loads the selected service program from the service card and executes it, as indicated at block 118. For typical carrier services, the service program displays a standard carrier waybill form used by the selected carrier. For example, if the U.S. Postal Service Express Mail service is selected, the form shown in FIG. 9 is displayed. The form includes a carrier identification field 130, service class field 131, and pointers on the display for inserting information in fields 132–137 and 140–146. A waybill identification number in bar code 138 and characters 139 is selected for the transaction and displayed. Preferably, the services card has a list of reserved waybill numbers which are sequentially incremented for each completed transaction. If a transaction is not completed, the number is saved for the next transaction. As described previously, the bar code can include a section which is an encryption of one element of the waybill information, so that the authenticity of the form can be verified by machine processing of the waybill.

The services program as executed by the terminal MPU 30 next uses cursor prompts to request the user to provide information for certain fields, such as the zip codes of origin and destination 132 and 133, and the addresses of the sender and recipient 140 and 141. As the user supplies each item of information and presses an "Enter" key, the program causes the cursor to shift to the next field of information to be supplied, as indicated by the arrows C in FIG. 9. The date and time fields 134 and 135 may be requested from the user or supplied from the terminal if it is provided with a clock and calendar. The weight 136 may be provided from the output of the scale 53, if connected to the terminal, or supplied by the user. The meter identification number (MIN) is supplied by the terminal for field 137.

Based upon the origin and destination zip codes and weight, the postal amount, other service charges, and the total amount 144-146 are calculated and displayed under program control using the rate card if appropriate. The total transaction amount is saved. If the "Print" key is depressed, the terminal program then sends the "commence" signal to the card MPU and printer MPU to execute the handshake procedure and debiting and printing operations as previously described. If an "Auto" mode key of the terminal is depressed or the user elects to continue in response to a prompt, the terminal program returns to the beginning of the transaction loop indicated at block 113. The terminal operation is terminated if the transaction loop is not continued, or if the handshake procedure is not completed.

The terminal can be used to program and print the waybills of other selected carriers or services by insertion of the proper user, rate and/or service cards. For convenience of the automated terminal system, it is desirable if all postal and waybill forms can be standardized to one or a limited number of form blanks.

Refilling Terminal

Another embodiment of the invention is the provision of a user card refilling terminal which may be maintained at any desired postal retail or distribution location for the convenience of the issuer of the cards and users. A new amount can be "filled", i.e. credited to an authorized balance maintained in the user card, and a master refilling card having a greater amount for distribution is correspondingly debited. In accordance with the principles of the invention, the secure handshake recognition procedure is executed before the transaction is authorized. The refilling terminal can also be used to validate new cards to be issued.

Figure 10:
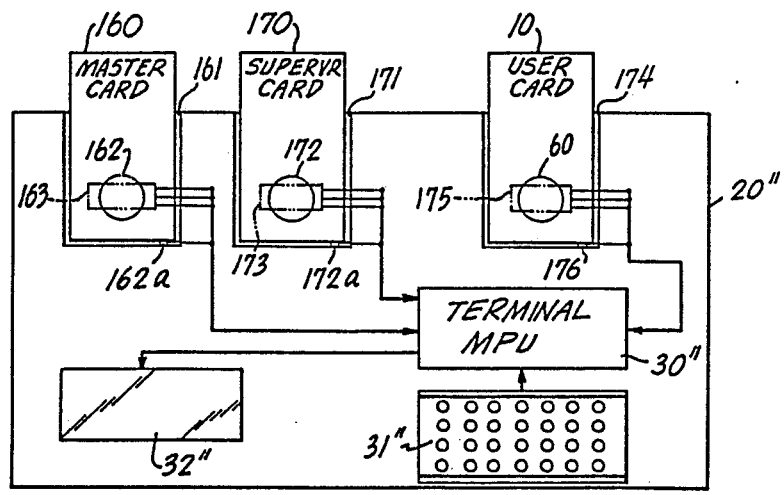
FIG. 10 illustrates schematically a preferred embodiment of an automated refilling terminal using a microprocessor card, a master card, and a supervisor card in accordance with the invention.

An exemplary embodiment of the refilling terminal 20 is shown in FIG. 10, having a first slot 161 for a master refilling card 160, a second slot 171 for a supervisor card 170, a third slot 174 for a user card 10, a terminal microprocessor 30", a keyboard 31", and a display 32". Each card is of the type described previously, with secure microprocessors (MPU) 162, 172, and 60, respectively, in contact with respective terminal contacts 163, 173, and 175. Switches 162a, and 172a, and 176 provide detection signals when the cards are inserted in their respective slots. The operation of terminal MPU 30" is enabled after insertion of a master card 160 and a supervisor card 170.

A master refilling card is initially purchased from a central issuer, such as the U.S. Postal Service, an authorized distributor for the central issuer, or a private carrier company. It is generally intended to be purchased by a local refilling entity which provides service to individual users, such as a bank branch, retail store, or corporate department. In the preferred embodiment, it is manufactured in a fixed denomination and remains locked until it is activated by a supervisor card of the central issuer. The encryption algorithms used for the handshake procedure are already written into its MPU firmware, and is enabled to execute the handshake procedure when the secret key number is installed by a supervisor card during the activation procedure. Once activated, the master card balance is debited for refilling transactions until it is used up. A history of all debiting transactions is maintained in the master card.

A supervisor card is provided by the central issuer in the custody of an officer or manager of the local refilling entity and a supervisor PIN is assigned. The supervisor card is used to unlock all master cards sold to the refilling entity and to maintain a record of the serial numbers of the master cards for subsequent card confirmation procedures. It is used to authorize crediting transactions to user cards, and maintains a transaction record of all refilling operations and the identity of the recipient user cards. The supervisor card is manufactured with the handshake encryption algorithms in firmware, and may be provided by the central issuer with a secret key number to be installed in the master and user cards. The master and supervisor cards together allow user cards to be conveniently refilled at widely distributed local entities without the need for on-line confirmation of each refilling transaction from the central issuer. Alternatively, the user card can be refilled by the master card alone, with the handshake procedure executed between the user card's MPU and the master card's MPU. However, the use of a controlling supervisor card is preferred as an additional level of security to deter counterfeiting or fraudulent use of the higher value master cards.

Figure 11:
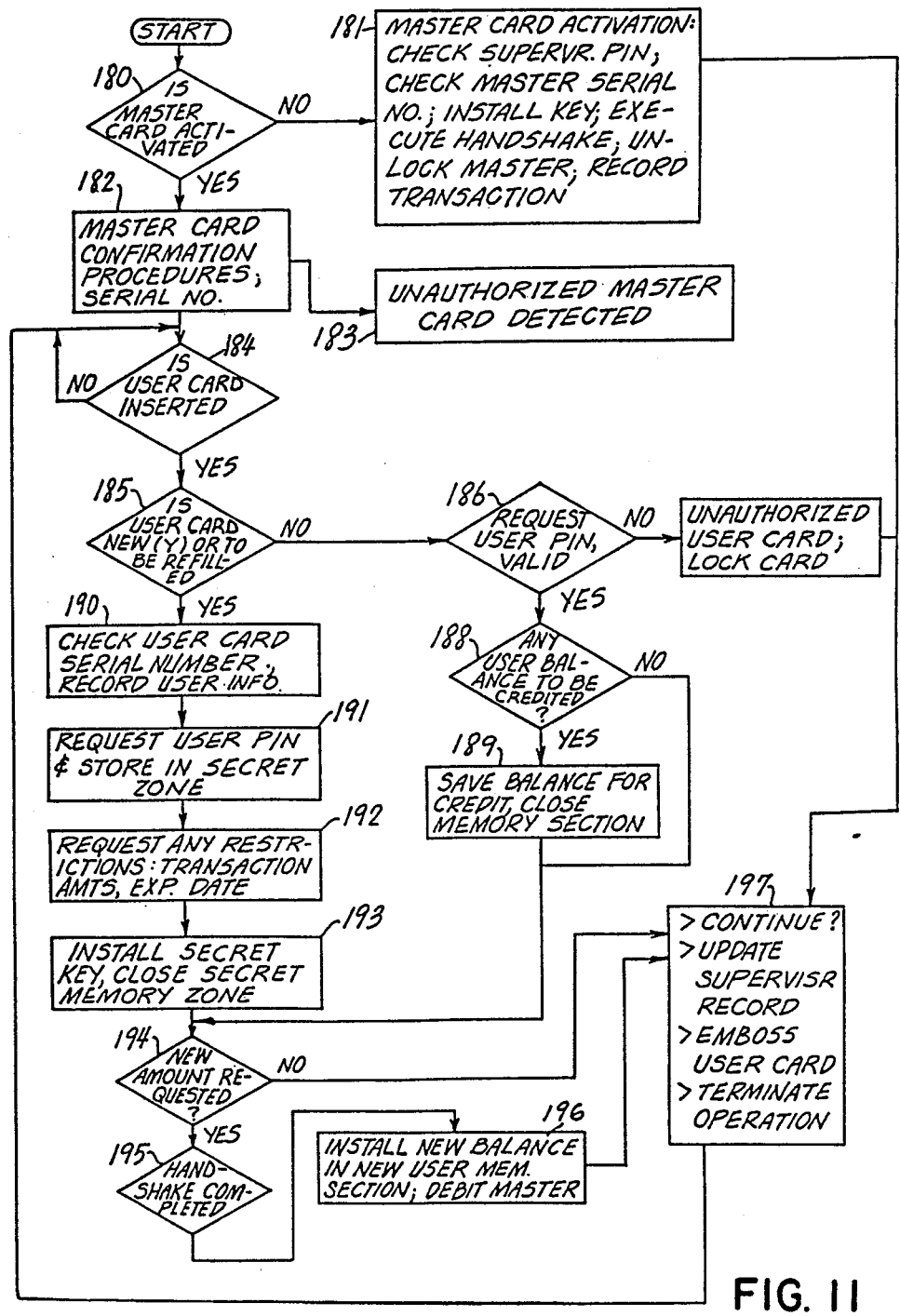
FIG. 11 is a flow diagram of the operation of the terminal of FIG. 10.

The operation of the refilling terminal will now be described for the preferred three-card embodiment with reference to the block diagram of FIG. 11. Upon initiation of the terminal program, the master card is checked at block 180 to determine if it is already activated. If not, the terminal follows an activation procedure at block 181 of confirming the supervisor PIN, checking the master card serial number, installing a secret key number in the master card, executing the handshake procedure, then unlocking the master card's balance, and recording the master card's serial number, balance, date, and other transaction information.

If the master card has already been activated, the supervisor card checks the master card serial number against its record of authorized master cards. If the master card is unauthorized, the terminal program goes to an end procedure at block 197. With an authorized master card, the terminal program checks if the user card inserted in the terminal is new or to be refilled. For a new user card, the refilling terminal executes at blocks 190-193 a validation procedure which includes checking the designated card serial number with the number embedded in its memory, recording the user's identification information, and assigning a user PIN. At block 192, the terminal prompts the operator for any limitations on the amounts or types of transactions the card can be used for, the identification numbers of the terminals to which the card is restricted, or an expiration date if required by the issuer. The validation procedure is completed by installing the secret key number and sealing the secret memory zone.

If the user card is to be refilled, the user PIN is confirmed, and then the card is checked for any balance to be credited toward the new amount or to the user's account. The old memory section is then locked from further transactions, and can only be used for reading out a transaction history. Upon a request for a new amount, either for a new card that has been validated or for a card to be refilled, the terminal MPU 30" opens a handshake channel, and the handshake procedure previously described is executed between the master MPU 162 and the supervisor MPU 172. When the handshake procedure is completed, the master balance is debited and the supervisor card proceeds to open a new transaction memory section in the user card into which the new balance is written. The program then provides at block 197 an end selection of further operations which may be carried out on the refilling terminal. For example, another refilling transaction may be processed, the supervisor card record may be updated, the newly validated user or master card may be embossed with a serial number or account number if the terminal is connected to an embossing machine, or operations may be terminated.

The described refilling system is protected at several levels of security. First, a supervisor card is required, and the user card must be validated by the user PIN. The master card must be validated by the supervisor card and must execute the handshake procedure before the user card is credited with a new amount. The card/terminal system has the primary advantage that the debiting of the card balance is executed in the same time frame that the value dispensing operation is carried out, and the exchange can only be carried out for each transaction if the mutual handshake recognition procedure is executed between the secure microprocessors controlling each part. Also, the central issuer purchases the card/terminal system from the manufacturer with a given set of encryption algorithms, and then selects a unique secret key not known to the manufacturer. Thus, penetration of the manufacturer's security will not compromise the security of the issuer's system. By issuing cards with defined expiration dates or series numbers and changing the secret keys periodically, an issuer system can be made even more impenetrable to counterfeiters.

The user's card is not merely a passive record of an account number and balance, but rather operates to affirmatively protect against unauthorized use of the card, for example, if a succession of incorrect PIN entries is made, if the card is used beyond its expiration date or in an unauthorized machine, or if a requested transaction is in excess of predetermined limits. Similarly, the value dispensing part of the terminal is protected against tampering by the physical bonding of the printer microprocessor to the print head.

Moreover, since th epostal and refilling transactions are executed with cards issued by a central issuer take place only within the issuer's system, they are protected from counterfeit cards or cards issued by another system. One issuer's system thus remains closed to all other issuers systems, and several systems can use the same terminals without interference from the other. For example, the U.S. Postal Service and several private carriers can each constitute a separate issuer system issuing its own cards. A user can purchase a card from each system and use the proper card in any terminal maintained at a local entity (branch post office, bank branch, local retail store) to generate authorized postage or a waybill for use in the corresponding system. Thus, users will have the benefit of secure and convenient access to a wide range of postal and carrier services.

Figure 12:
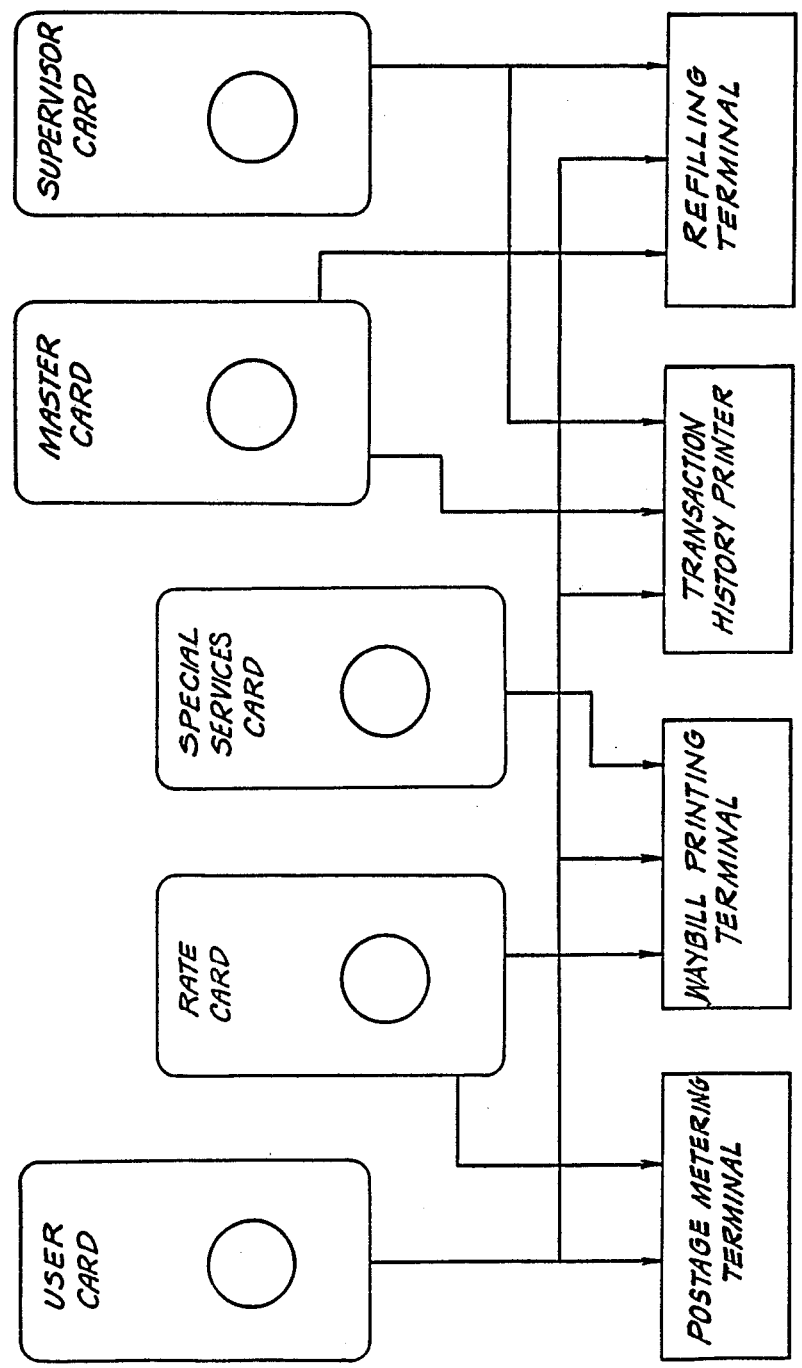
FIG. 12 shows the integrated system of microprocessor cards, memory cards, and terminals of the invention.

In the invention, the microprocessor cards (user, master, and supervisor), memory cards (rate and special services), and terminals (metering, waybill printing, and refilling) comprise an integrated postal transaction system which provides a greatly improved level of access, convenience, and security, compared to conventional postal machines. The overall system is illustrated in FIG. 12. It allows widely issued user cards to be used in widely distributed postage metering and waybill printing terminals, with the appropriate rate and/or services cards, to access a plurality of postal and carrier services. The refilling terminals allow a central issuer to distribute postal monetary value to users at widely distributed locations. Strict physical access controls are not required, the need to limit the postal amounts and services obtainable by issued cards is reduced, in-person purchase transactions are avoided, and on-line confirmation by a central accout office is obviated. The cards and terminals are configured to be autonomous, yet mutual recognition and confirmation of validity and transaction amounts are required, thereby providing a high level of security for the system.

Further, the invention is not limited to the described automated postal terminals. The principles of the invention can be adapted to any other value exchanging transaction where it is desired to use an account card in an off-line automated terminal system. Thus, the described cards and value dispensing terminals can also be used for dispensing cash, printing tickets, issuing coupons, etc., and the user can possess a variety of cards each issued by a central issuer for the convenient purchase of different articles of value. Also, by implementing card and terminal MPU programs which check for authorized machine identification numbers and card serial numbers, or execute the handshake procedure with different algorithms and/or secret keys, an issuer's system can be configured so that the issuer's cards and terminals may be made open or restricted to certain families, series or locations.

The invention also encompasses other features which are useful adjuncts to the central concepts described above. For example, a transaction history printer may be provided from which a user can print a record of transactions stored in the card upon entry of the correct PIN. The various cards can be provided with notches on a border or coded key elements to prevent insertion of the wrong card in an incorrect terminal slot or in a terminal of another issuer system. Also, the invention can be adapted for on-line transaction systems. For example, the terminal MPU can be connected by a telephone line or local network to a central processing office for approval of a transaction prior to execution of the transaction. On-line confirmation may be desired for initialization and refilling transactions which are less frequent and of higher value than purchase transactions. As another security feature, the card or series of cards may be issued with encryption algorithms and/or secret key numbers which are changed periodically, and the encryption algorithms and secret keys corresponding to cards presented for a transaction can be loaded in the terminal at the time the terminal MPU establishes an on-line connection to the central office.

Based upon the foregoing disclosure, many other peripheral features and modifications and variations on the principles of the invention will become apparent to persons familiar with automated terminals and microprocessor card systems. It is intended that the embodiments and features described herein and all further features, modifications, and variations be included within the allowed scope of the invention, as it is defined in the appended claims.

What is claimed is:

1. An automated transaction system comprising:
   (a) a plurality of user cards each issued to a respective user and having a user card microprocessor and a memory incorporated therein for maintaining a history of user account transactions and a user account balance therein, each said user card having data output means connected to said user card microprocessor;
   (b) a plurality of master cards each having a master card microprocessor and a memory incorporated therein for maintaining a history of master account transactions and a master account balance therein, each said master card having data output means connected to said microprocessor;
   (c) a plurality of terminals each having first receiving means for receiving any one of said plurality of user cards inserted therein and establishing a connection with said user card data output means, second receiving means for receiving one of said plurality of master cards inserted therein and establishing a connection with said master card data output means, operating means for performing a set of desired terminal functions, and first path means for establishing a data communication path between the user card microprocessor of a user card inserted in said first receiving means and the master card microprocessor of a master card inserted in said second receiving means of said terminal;
   (e) said user cards and said master cards each having program means for performing an account transfer transaction between a user card and a master card inserted in a terminal wherein value from the account balance of one card is debited and the account balance of the other card is correspondingly credited; and
   (f) transaction history recording means for receiving a user card or a master card therein and producing a transaction history record of the account transactions stored in said card.

2. An automated transaction system according to claim 1, wherein said transaction history record is a record of account transactions executed by a user card.

3. An automated transaction system according to claim 1, wherein said transaction history record is a record of account transfer transactions from a master card to a number of user cards.

4. An automated transaction system according to claim 1, wherein said transaction history record is a record of account transfer transactions from a number of user cards to a master card.

5. An automated transaction system according to claim 1, wherein each master card is assigned to a respective one of said plurality of terminals and maintains a history of master account transactions executed between each said master card assigned to said respective terminal and a number of user cards inserted for transactions in said terminal.

6. An automated transaction system according to claim 5, further comprising:
   a supervisor card having a supervisor card microprocessor mounted therein and data output means connected to said microprocessor;
   each respective terminal having third receiving means for receiving a supervisor card inserted therein and establishing a connection with said supervisor card data output means, and second path means for establishing a data communication path between said master card microprocessor of said assigned master card inserted in said second receiving means and said supervisor card microprocessor of said supervisor card inserted in said third receiving means of said respective terminal; and
   said supervisor card microprocessor having program means for communicating with said master card microprocessor to authorize said assigned master card to execute account transfer transactions in said respective terminal with user cards inserted therein.

7. An automated transaction system according to claim 1, wherein each card microprocessor stores a series of records of account transactions in its associated memory, and a current account balance for a card is computed from the stored records.

* * * * *